(No Model.)
J. H. KIRK.
BOB SLED.
No. 294,883. Patented Mar. 11, 1884.
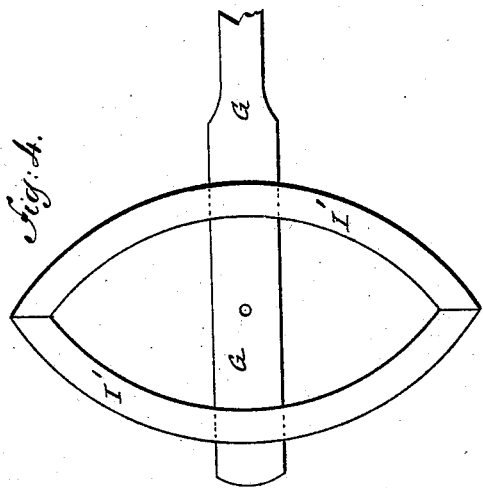
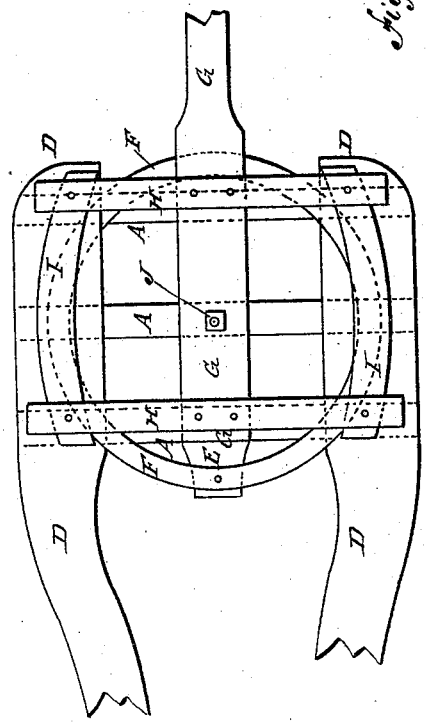
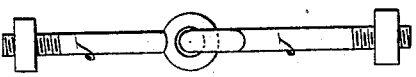
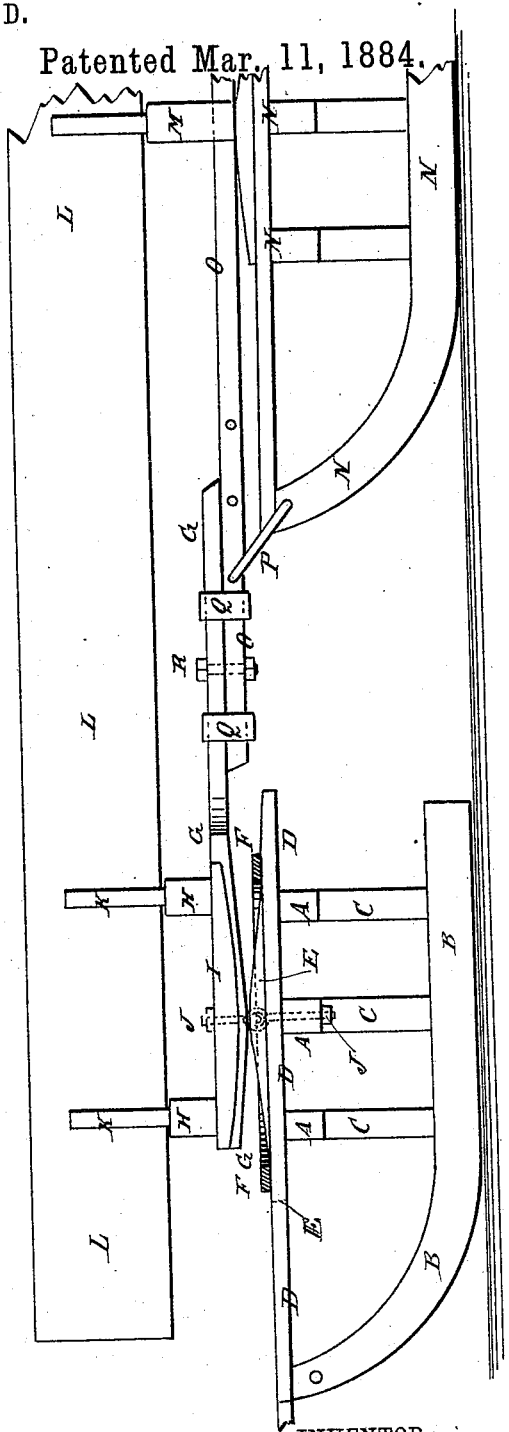
WITNESSES:
Chas. Nider
C. Sedgwick
INVENTOR:
J. H. Kirk
BY Munn & Co
ATTORNEYS.

UNITED STATES PATENT OFFICE.

JOSEPH HAINES KIRK, OF BRADY, CLEARFIELD COUNTY, ASSIGNOR TO HIMSELF AND MILES A. KIRK, OF BELLEFONTE, PENNSYLVANIA.

BOB-SLED.

SPECIFICATION forming part of Letters Patent No. 294,883, dated March 11, 1884.

Application filed January 11, 1884. (No model.)

*To all whom it may concern:*

Be it known that I, JOSEPH H. KIRK, of Brady township, in the county of Clearfield, and State of Pennsylvania, have invented certain new and useful Improvements in Bob-Sleds, of which the following is a full, clear, and exact description.

Reference is to be had to the accompanying drawings, forming part of this specification, in which similar letters of reference indicate corresponding parts in all the figures.

Figure 1 is a plan view of the forward bob of a sled to which my improvement has been applied. Fig. 2 is a side elevation of the sled. Fig. 3 is an elevation of the jointed king-bolt. Fig. 4 shows a modification of the platform.

The object of this invention is to construct bob-sleds in such a manner that they can adapt themselves to uneven surfaces without throwing undue strain on any part of the sled.

The invention consists in a bob-sled constructed with a platform or double bolster and a jointed king-bolt, whereby the said bob will be free to move in any direction without affecting the position of the said platform. To the forward bob and its saddle is attached an annular plate, to come in contact with the side bars of the platform and the forward part of the reach attached to the platform, and limit the rocking and pitching of the said bob, as will be hereinafter fully described.

A are the beams of the forward bob, which are connected with the runners B by the knees C, and to which the raves D are attached.

To the centers of the beams A is attached the saddle E, the upper side of which is rounded, and to the ends of which and to the raves D is attached the annular plate F.

Upon the saddle E rests the forward end of the forward part, G, of the reach, which, in connection with the bolsters H and connecting-bars I, forms the platform, the bars I serving as stops, against which the plate F at any point of its upper face may strike to limit the rocking and pitching of the bob.

Two or more bolsters, H, may be used, and the said bolsters are attached to the forward part, G, of the reach and to the connecting-bars I; or the bolster H can be attached to two curved bars, I', attached at their middle parts to the said forward part of the reach, with their ends meeting upon the opposite sides of the said part G of the reach, as shown in Fig. 4.

J is the king-bolt, which passes through the forward part, G, of the reach, through the saddle E, and through the beam A, upon which the center of the said saddle E rests. The king-bolt J is secured in place by nuts screwed upon its ends, and is made in two parts jointed to each other at the point where the forward part, G, of the reach comes in contact with the saddle E, so that the bob will have a free movement in every direction beneath the platform.

The bolsters H are provided with stakes K, to keep the forward part of the sled-body L in place, so that the said body will be held at points in front and rear of the king-bolt, and the body and bolsters will be prevented from moving upon each other.

The rear part of the sled-body rests upon the bolster M of the rear bob N.

O is the rear part of the reach, which passes through a hole in the bolster M, and is connected with the forward end of the rear bob, N, by a bail, chain, or other suitable connection, P. Several holes are formed in the rear part, O, of the reach, to receive the connection P, so that the sled can be readily lengthened and shortened, as may be required. The rear end of the forward part, G, of the reach and the forward end of the rear part, O, overlap each other, and are connected by two keepers, Q, and a bolt, R, so that the rear part, O, of the reach can be readily detached and replaced by a longer or shorter one, as may be required. With this construction the sled is free to adapt itself to an uneven surface, and can be turned in a very small space without unduly straining any of its parts.

Having thus described my invention, what I claim as new, and desire to secure by Letters Patent, is—

1. A bob-sled constructed, substantially as herein shown and described, with a platform or double bolster and a jointed king-bolt, as set forth.

2. In a bob-sled, the combination, with the forward bob, A B C D, having saddle E, and the forward part, G, of the reach, of the platform or double bolster H I and the jointed king-bolt J, substantially as herein shown and described, whereby the said bob will be free to move in any direction without affecting the position of the said platform, as set forth.

3. In a bob-sled, the combination, with the forward bob, A B C D, the saddle E, the forward part, G, of the reach, and the platform H I, of the annular guard-plate F, substantially as herein shown and described, whereby the rocking and pitching of the said bob will be limited, as set forth.

JOSEPH HAINES KIRK.

Witnesses:
J. HAMILTON,
DANIEL GOODLANDER.